United States Patent [19]

Hu et al.

[11] Patent Number: 5,804,889
[45] Date of Patent: Sep. 8, 1998

[54] UN-INTERRUPTIBLE POWER SUPPLY APPARATUS FOR DIFFUSION FURNACE

[75] Inventors: Chu Lin Hu; Chin-Chuan Chung, both of Hsinchu Hsian; Albert Sang; Kuo-Tunt Wei, both of Hsinchu, all of Taiwan

[73] Assignee: United Microelectronics Corp., Hsinchu, Taiwan

[21] Appl. No.: 729,765

[22] Filed: Oct. 7, 1996

[30] Foreign Application Priority Data

Jul. 29, 1996 [TW] Taiwan .................................. 85211603

[51] Int. Cl.$^6$ ....................................................... H02J 3/04
[52] U.S. Cl. .............................. 307/64; 307/44; 307/85; 307/86; 505/869
[58] Field of Search ............................ 307/86, 85, 64, 307/66, 43, 44; 505/869

[56] References Cited

U.S. PATENT DOCUMENTS

| | | | |
|---|---|---|---|
| 3,778,634 | 12/1973 | Hanrihan | 307/64 |
| 4,692,632 | 9/1987 | Gaul et al. | 307/64 |
| 5,138,185 | 8/1992 | Weinstock | 307/66 |
| 5,210,685 | 5/1993 | Rosa | 307/64 |
| 5,376,828 | 12/1994 | Kim et al. | 307/64 |

Primary Examiner—William M. Shoop, Jr.
Assistant Examiner—Albert W. Paladini
Attorney, Agent, or Firm—Rabin & Champagne, P.C.

[57] ABSTRACT

A un-interruptible power supply (UPS) apparatus for a diffusion furnace used in semiconductor device fabrication. The diffusion furnace consists of a power electronic subsystem coupled to a three-phase utility power source via two series-connected normally-open main circuit breaker switches, an automatic control unit, and a direct-current power supply. The automatic control unit controls the operation of the diffusion furnace. The UPS apparatus includes a UPS unit having a power input connected to a node between the two series-connected normally-open main circuit breaker switches. A first normally-open circuit breaker has a switch connected between the output of the UPS unit and the power input of the automatic control unit. A second normally-open circuit breaker has a switch connected between a first phase power line of the three-phase utility power source and the input of the direct-current power supply. A third normally-closed circuit breaker has a switch connected to the output of the UPS unit. A fourth normally-open circuit breaker has a switch connected between the output of the UPS unit and the input of the direct-current power supply. In operation, the apparatus is switched on to maintain the power supply to the diffusion furnace for a predetermined time when there is a main power line failure.

20 Claims, 2 Drawing Sheets

UN-INTERRUPTIBLE POWER SUPPLY APPARATUS FOR DIFFUSION FURNACE

BACKGROUND OF THE INVENTION

1. Field of the Invention

The invention relates in general to a diffusion furnace for a semiconductor integrated circuit device fabrication facility, and, in particular, to an un-interruptible power supply for a diffusion furnace. More particularly, the invention relates to an un-interruptible power supply system for a diffusion furnace employing a few electromagnetic relay devices or solid state relay devices to enable sustained operation of the furnace without abnormal interruptions.

2. Technical Background

Un-interruptible power supply (UPS) units have been widely incorporated into electrical power supply systems for semiconductor manufacturing facilities. They are used to provide un-interrupted electrical power to equipment in the facility, which would be subject to severe damage and loss if power is abruptly interrupted. For some semiconductor fabrication equipment supplied by a three-phase 208-volt power line, digital electronic control systems thereof are powered by the separate 110-volt lines. For this equipment, if the control systems are to be connected to the necessary 110-volt power source provided by the UPS system, there are normally layers of protective switches present that frequently result in power loss when the utility supply line is unstable. Without these UPS units, however, the damage and loss would be even greater in case of main power instability or outage.

Diffusion is an indispensable technique used in semiconductor integrated circuit (IC) device fabrication. Dopants are driven into the semiconductor substrate to form P or N-type regions necessary for constructing IC device circuitry elements. Essentially, dopants are driven into the substrate under high temperature. At high temperatures, dopants exhibit faster diffusion speed into the substrate, in particular into a silicon substrate. Diffusion can be generally divided into pre-deposition and drive-in procedural steps that are carried out in a diffusion furnace. FIG. 1 of the accompanying drawing schematically shows the block diagram of portions of the electrical circuitry of a conventional diffusion furnace.

A typical diffusion furnace, such as Model 6000, 7000 or 8000 manufactured by Silicon Valley Group (SVG) of California is supplied by a three-phase 208-volt power source without UPS back-up support. As is seen in FIG. 1, three power lines $\phi 1$, $\phi 2$ and $\phi 3$ of the AC three-phase power system are connected via two series sets of three-phase normally-open breaker switches K1 and K4 to the power electronic components of the diffusion furnace. These normally-open circuit breaker switches may be electromagnetically actuated circuit breaker switches that rely on the excitation of exciter coils to maintain the circuit switch thereof in closed-circuit status. One of the three-phase power lines, $\phi 3$ for example, is tapped to provide single-phase power for the 24-volt DC power supply unit 11 via the feed line L1. The tapping point of the feed line L1, as seen in the drawing, is at a point along the power line $\phi 3$ preceding the two sets of series circuit breaker switches K1 and K4.

In a similar manner, one of the three-phase power lines, $\phi 3$ for example, is further tapped to provide the single-phase power for the automatic control unit 10 via the feed line L2. The tapping point of the feed line L2 is at a point along the power line $\phi 3$ between the two series circuit breaker switches K1 and K4.

Feed line L1 also provides electrical power to the exciter coils CK1 and CK4 for the circuit breaker switches K1 and K4, respectively. As mentioned above, these exciter coils CK1 and CK4, when excited by AC power supplied along the feed line L1 via the switches K31 and K2, respectively, actuate the main circuit breaker switches K1 and K4 to enable a closed-circuit status, that is, to close circuit breaker switches K1 and K4. The system operates generally in the following manner.

First, when the push-button switch MB is depressed, the exciter coil CK3 gets excitation that actuates the breaker switch K31 to close so as to excite the exciter coil CK1. Then, as a result of excitation in the exciter coils CK1, switches of the normally-open circuit breaker switch K1 become closed-circuited. This allows energization of the feed line L2, supplying single-phase AC power to the automatic control unit 10.

Afterwards, the main switch to the power electronic circuitry (not shown) is depressed to close-circuit the switch K2. As a result, the exciter coil CK4 for the main circuit breaker switch K4 is actuated. As a result of excitation in the exciter coils CK4, switches of the normally-open circuit breaker switch K4 become closed-circuited. This allows the power electronics of the diffusion furnace to be energized as operation of the furnace is initiated.

When the utility power status is normal, the above-described procedure may be used to initiate operation of the furnace. However, when abnormal conditions arise in the three-phase power lines, control over the furnace operation is lost completely.

SUMMARY OF THE INVENTION

It is therefore an object of the invention to provide an un-interruptible power supply apparatus to sustain normal operation of the diffusion furnace.

The invention achieves the above-identified object by providing a UPS apparatus for a diffusion furnace for semiconductor device fabrication. The diffusion furnace includes a power electronics subsystem coupled to a three-phase utility power source via two series-connected normally-open main power switches, an automatic control unit, and a direct-current power supply. The automatic control unit controls the operation of the diffusion furnace. The UPS apparatus includes a UPS unit having a power input for connection to a node between the two series-connected normally-open main power switches. A first normally-open circuit breaker has a switch connected to the power output of the UPS unit at a first terminal and for connection to a power input of the automatic control unit at a second terminal. A second normally-open circuit breaker has a switch for connection between a first phase power line of the three-phase utility power source and a power input of the direct-current power supply. A third normally-closed circuit breaker has a switch connected to the power output of the UPS unit. A fourth normally-open circuit breaker has a switch connected to the power output of the UPS unit at a first terminal and for connection to the power input of the direct-current power supply at a second terminal. The apparatus is smoothly switched on to sustain the power supplied to the diffusion furnace when there is a main power line failure, based on a simple circuitry arrangement of a few additional circuit breakers.

BRIEF DESCRIPTION OF THE DRAWING

Other objects, features, and advantages of the invention will become apparent by way of the following detailed description of the preferred but non-limiting embodiment. The description is made with reference to the accompanied drawings in which.

DETAILED DESCRIPTION OF THE PREFERRED EMBODIMENT

Figure 1:
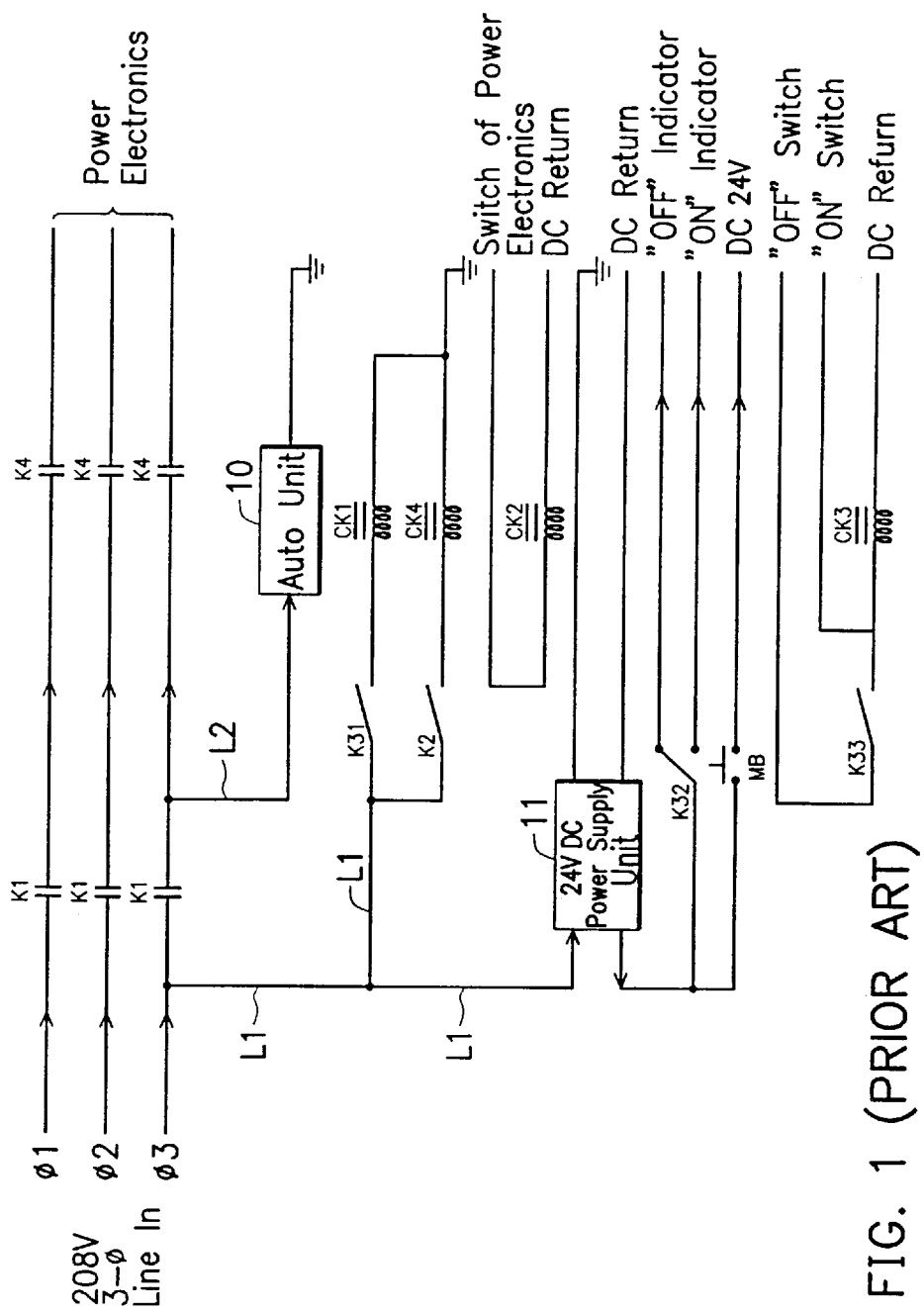
FIG. 1 schematically shows a block diagram of portions of the electrical circuitry of a conventional. diffusion furnace.
Figure 2:
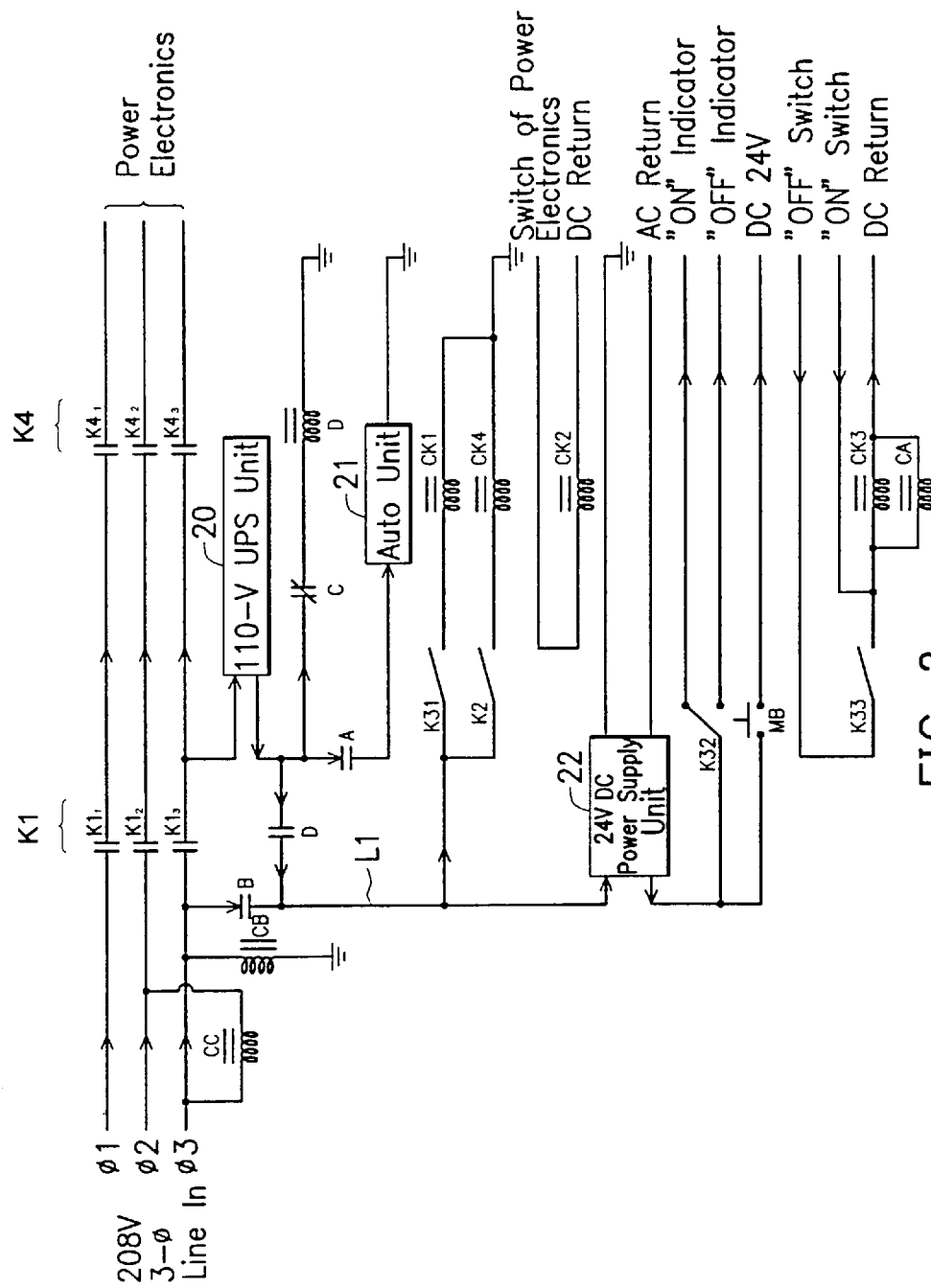
FIG. 2 schematically shows a block diagram of portions of the electrical circuitry of a diffusion furnace facility constructed in accordance with a preferred embodiment of the invention.

Referring to FIG. 2 of the drawing, the block diagram shows portions of the electrical circuitry of a diffusion furnace facility constructed in accordance with the preferred embodiment of the invention. For the described embodiment, three power lines $\phi 1$, $\phi 2$ and $\phi 3$ of the AC three-phase power system are connected, via two series sets of circuit breaker switches K1 and K4, to the power electronic components of the diffusion furnace, which are not shown in the drawing. As schematically shown, however, each of the two main AC power supply line circuit breaker switches K1 and K4 has three normally-open switches ($K_1$, $K1_2$, and $K1_3$; and $K4_1$, $K4_2$, and $K4_3$), one for each of the three power phases. These normally-open circuit breaker switches may be electromagnetically actuated circuit breaker switches that rely on excitation of exciter coils to maintain the circuit switches thereof in a closed-circuit status. Thus, all circuit breakers described herein will include a switch of some sort, as well as a switch actuator, or exciter coil.

One of the three-phase power lines, $\phi 3$ for example, is tapped to provide the single-phase power for the 24-volt DC power supply unit 22 via feed line L1. As shown in the drawing of FIG. 2, the feed line L1 is tapped off the power supply through a normally-open circuit breaker switch B. The circuit breaker switch B is closed by the exciter coil CB, which is energized directly by the power line, $\phi 3$ in this embodiment, and remains energized as long as the supply condition of the three-phase main power source is normal. As a result, the circuit breaker switch B is in a closed-circuit condition as long as there is a normal supply in the three-phase main power source. The tapping point of the feed line segment L1 via the circuit breaker switch B, as shown in the drawing, is made at a point along the power line $\phi 3$ preceding the two sets of series circuit breaker switches K1 and K4. This means that the circuit components or subsystems tied to the feed line L1, including the 24-volt DC power supply unit 22, retain connection to the power supply as long as the three-phase power supply is normal.

Thus, the feed line segment L1 also provides electrical power to the exciter coil sets CK1 and CK4 for the circuit breaker switches K1 and K4, respectively. Note that each of the exciter coil sets CK1 and CK4 shown is a general representation of three exciter coils for the three power phases, as persons skilled in the art will appreciate. These exciter coil sets CK1 and CK4, when excited by AC power supplied along the feed line L1 via the switches K31 and K2, respectively, actuate the main circuit breaker switches K1 and K4 so as to enable closed-circuit status for transfer of electrical power along the three-phase feed lines. Power electronic components of the diffusion furnace, not shown in the drawing, may thus be supplied with the power required for fabrication processing operations.

Via an un-interruptible power supply unit, herein referred to as UPS unit 20, one of the three-phase power lines, $\phi 3$ in this described embodiment (although either of the other two may also be used), is further tapped to provide single-phase power for the automatic control unit 21. The tapping point of the feed line for UPS unit 20 is located along the power line $\phi 3$ between the two series circuit breaker switches K1 and K4.

The output segment of the UPS unit 20, that is, the single-phase power source that is sustained by the UPS, equipment for a designated period of time, even during a power utility failure, supplies power to an automatic control unit 21 for providing control of the diffusion furnace system in a manner that is unaffected by a power failure. As shown, power is supplied to the automatic control unit 21 via a normally-open circuit breaker switch A, which is actuated (closed) by excitation at a coil CA, which will be detailed later in the following paragraphs.

The output segment of the UPS unit 20 also provides un-interrupted power to the feed line L1 that supplies power to the 24-volt DC power supply unit 22 via a normally-open circuit breaker switch D. The exciter coil CD for this breaker switch D is energized by the UPS unit 20 via a normally-closed circuit breaker switch C. The breaker switch C in turn has its actuation exciter coil CC energized directly by the three-phase main power supply, as shown in the drawing, across the two phase lines $\phi 2$ and $\phi 3$. According to this arrangement, the circuit breaker switch C is maintained in an open-circuit status as long as normal power is supplied by the three-phase utility system. This in turn de-energizes the excitation coil CD for the circuit breaker switch D. The circuit breaker switch D is thus maintained in an open-circuit status when the three-phase power is in a normal condition, decoupling the output of the UPS unit 20 from the active feed line L1.

When, however, the main three-phase power fails, the circuit breaker switch C conducts because of the loss of excitation at the excitation coil CC, while the excitation coil CD for the circuit breaker switch D is actuated by the UPS unit 20 and is activated to supply the UPS power to the feed line L1. At this time, the circuit breaker switch B is open-circuited because its exciter coil CB is de-energized as a result of the main power failure, and the output of the UPS unit 20 is thus safely decoupled from the main power line of the three-phase utility system.

The direct current output of the 24-volt DC power supply unit 22 supplies several operation indicator lights, including a light indicating the operating status of the functionality of the diffusion furnace included in this portion of the electrical circuitry, outlined in the drawing of FIG. 2, for example. A main operation activation switch MB is used to control actuation of the operation of the diffusion furnace facility. When the main switch MB is switched into its "on" position, an "ON" indicator light (not shown in the drawing) is turned on, and the exciter coil CK3 for the circuit breaker switch K31 is energized, enabling closed-circuit status for K31. At the same time, the exciter coil CA, connected in parallel with the coil CK3, is also energized. Thus, once the main switch MB is switched to the "on" position, the circuit breaker switch A is also actuated and put in closed-circuit status. The automatic control unit 21 may thus receive power to function normally for controlling the operation of the diffusion furnace.

When the main switch MB is returned to the "off" position, an "OFF" indicator light (not shown in the drawing) is turned on, and the exciter coil CK3 of the circuit breaker switch K3 loses its excitation, so that the circuit breaker switch K31 is returned to its normally-open status.

This removes the excitation power source for the coil set CK1, and the three-phase main power supply to the power electronic components for the diffusion furnace is cut off. When the furnace loses power, the excitation coil CK2 also loses its excitation, and the switch K2 is returned to its normally-open status as a result, further enabling an open-circuit status for the circuit breaker switch K4

The above paragraphs describe the operation of the system when the three-phase power utility supply is operating under normal conditions. Under such normal operating circumstances, basically, the system operates in the following manner.

First, the power in the utility lines energizes the excitation coils CB and CC for the circuit breaker switches B and C, respectively. This keeps the circuit breaker switches B and C in closed- and open-circuit status, respectively. As a result, power is supplied to the 24-volt DC power supply unit 22, while the output segment of the UPS unit 20 is isolated from the feed line L1 for unit 22.

Then, when the system operator actuates the main switch MB to the "on" position, the exciter coils CK3 and CA are both energized to actuate the circuit breaker switches K31 and A into closed-circuit status. As a result, the coil set CK1 is energized to put the circuit breaker switch K1 into closed-circuit status. Since the circuit breaker switch K1 is switched on, power is then supplied to the UPS unit 20 for charging the battery or any other suitable energy storage means. Further, the automatic control unit 21 is also activated to control the functionality of the diffusion furnace.

Then, the power electronic sections of the diffusion furnace is turned on by the operator, which energizes the excitation coil CK2, so that the circuit breaker switch K2 may in turn energize the coil set CK4. As a result, the main power circuit breaker switch K4 may be activated into closed-circuit status to supply power to the power electronics section of the diffusion furnace. The furnace system can now operate, as the three-phase power source is operating under normal supply conditions.

However, when a power outage condition arises, the system operates in the following manner.

The exciter coils CB and CC lose excitation power, and the circuit breaker switches B and C are put in open- and closed-circuit status, respectively. The exciter coil CK1 loses excitation power, and thus the circuit breaker K1 is put in an open-circuit status. The UPS unit 20, acknowledging the power failure condition, initiates a power supply operation and supplies power to the 24-volt DC power supply unit 22 via the close-circuited breaker switch D, as the exciter coil CD is now energized.

The system operator may depress the main switch MB to the ON position, and exciter coils CK3 and CA are thus energized. Circuit breaker switches K31 and A are thus closed, and the automatic control unit 21 may thus be powered by the UPS unit 20 via the closed circuit breaker switch A. Since the automatic control unit 21 is powered by the back-up power equipment, that is, the UPS unit 20, normal functionality of the diffusion furnace can continue during the designed utility power failure time period. That is, the UPS unit 20 can be designed to provide power for a predetermined amount of time that is satisfactory for its intended use. The operation of the system is substantially the same as when the three-phase power is normal as described above.

Thus, the system of the invention is characterized by several advantages when compared with conventional furnaces. First, a smooth transfer of the power supply from the three-phase line to the UPS unit when a power failure occurs is implemented through the use of a small number of electromagnetic circuit breakers or solid-state switches arranged in a simple circuit. The diffusion furnace is thus safe from unexpected power loss when utility power supply fails. Secondly, the UPS unit may be quietly and automatically charged during the period when the utility line is normally supplying three-phase power.

The above description of the preferred embodiment of the invention is intended only for the purpose of description, not for the limitation of the scope of the invention. Modifications to the outlined embodiment of the invention may be apparent and should be considered to be within the scope of the invention as recited in the claims which follow.

What is claimed is:

1. A un-interruptable power supply apparatus for a diffusion furnace, the diffusion furnace including a power electronics subsystem coupled to a three-phase utility power source through first and second series-connected normally-open main power switches; an automatic controller; and a direct-current power supply; wherein the automatic controller controls operation of the power electronics subsystem; the apparatus comprising:

an un-interruptable power supply having a power input for connection to a node between the first and second series-connected normally-open main power switches, and a power output;

a first normally-open circuit breaker having a first circuit breaker switch to open and close electrical connection between the power output of said un-interruptable power supply and a power input of said automatic controller, the first circuit breaker switch having a first terminal connected to the power output of said un-interruptable power supply and a second terminal for connection to the power input of the automatic controller;

a second normally-open circuit breaker having a second circuit breaker switch to open and close electrical connection between a first phase power line of the three-phase utility power source and a power input of the direct-current power supply, the second circuit breaker switch having a first terminal for connection to an unswitched portion of the first phase power line and a second terminal for connection to the power input of the direct-current power supply;

a third normally-closed circuit breaker having a third circuit breaker switch to open and close electrical connection between the power output of said un-interruptable power supply and a system ground, the third circuit breaker switch having a first terminal connected to the power output of said un-interruptable power supply and a second terminal for connection to the system ground; and a fourth normally-open circuit breaker having a fourth circuit breaker switch to open and close electrical connection between the power output of said un-interruptable power supply and the power input of said direct-current power supply, the fourth circuit breaker switch having a first terminal connected to the power output of said un-interruptable power supply and a second terminal for connection to the power input of said direct-current power supply.

2. The apparatus of claim 1, wherein the diffusion furnace further includes a first main power switch actuator, connected to the power input of the direct-current power supply through a main operation switch having an actuator, and a main operation switch actuator controller.

3. The apparatus of claim 2, wherein the main operation switch actuator is an excitation coil for actuating the main operation switch electromagnetically.

4. The apparatus of claim 2, wherein the diffusion furnace further includes
a second main power switch actuator, connected to the power input of the direct-current power supply through a power electronics switch, and
a power electronics switch actuator, controlled by the power electronics subsystem.

5. The apparatus of claim 4, wherein the power electronics switch actuator is an excitation coil for actuating the power electronics switch electromagnetically.

6. The apparatus of claim 4, wherein said first circuit breaker includes a first circuit breaker switch actuator, for connection in parallel with the main operation switch actuator.

7. The apparatus of claim 6, wherein said first circuit breaker switch actuator is an excitation coil for actuating said first circuit breaker switch electromagnetically.

8. The apparatus of claim 4, wherein said second circuit breaker includes a second circuit breaker switch actuator, for connection between a first phase power line of the three-phase utility power source and the system ground.

9. The apparatus of claim 8, wherein said second circuit breaker switch actuator is an excitation coil for actuating said second circuit breaker switch electromagnetically.

10. The apparatus of claim 4, wherein said third circuit breaker includes a third circuit breaker switch actuator, for connection between any two power lines of the three-phase utility power source.

11. The apparatus of claim 10, wherein said third circuit breaker switch actuator is an excitation coil for actuating said third circuit breaker switch electromagnetically.

12. The apparatus of claim 4, wherein said fourth circuit breaker includes a fourth circuit breaker switch actuator, having a first terminal connected to said third circuit breaker switch and a second terminal for connection to the system ground.

13. The apparatus of claim 12, wherein said fourth circuit breaker switch actuator is an excitation coil for actuating said fourth circuit breaker switch electromagnetically.

14. A diffusion furnace, comprising:
a power electronics subsystem;
first and second series-connected normally-open main power switches;
a three-phase utility power source coupled to said power electronics subsystem through said first and second series-connected normally-open main power switches;
an automatic controller for controlling said power electronics subsystem and including a power input;
a direct-current power supply having a power input;
an un-interruptable power supply having a power input connected to a node between said first and second series-connected normally-open main power switches, and a power output;
a first normally-open circuit breaker having a switch connected to open and close electrical connection between the power output of said un-interruptable power supply and the power input of said automatic controller;
a second normally-open circuit breaker having a switch connected to open and close electrical connection between an unswitched portion of a first phase power line of said three-phase utility power source and the power input of said direct-current power supply;
a third normally-closed circuit breaker having a switch connected to open and close electrical connection between the power output of said un-interruptable power supply and a system ground; and
a fourth normally-open circuit breaker having a switch connected to open and close electrical connection between the power output of said un-interruptable power supply and the power input of said direct-current power supply.

15. The diffusion furnace of claim 14, further including
a first main power switch actuator,
a main operation switch connected to open and close electrical connection between said first main power switch actuator and the power input of said direct-current power supply,
a main operation switch actuator, and
a main operation switch actuator controller.

16. The diffusion furnace of claim 15, further including
a second main power switch actuator,
a power electronics switch connected to open and close electrical connection between said second main power switch actuator and the power input of said direct-current power supply, and
power electronics switch actuator, controlled by said power electronics subsystem.

17. The diffusion furnace of claim 16, wherein said first circuit breaker includes a first circuit breaker switch actuator, connected in parallel with said main operation switch actuator.

18. The diffusion furnace of claim 16, wherein said second circuit breaker includes a second circuit breaker switch actuator, connected between a first phase power line of the three-phase utility power source and the system ground.

19. The diffusion furnace of claim 16, wherein said third circuit breaker includes a third circuit breaker switch actuator, connected between any two power lines of said three-phase utility power source.

20. The diffusion furnace of claim 16, wherein said fourth circuit breaker includes a fourth circuit breaker switch actuator, connected between said third circuit breaker switch and the system ground.

* * * * *